J. G. STROCK.
TOOTHPICK.
APPLICATION FILED MAY 14, 1909.

958,335.

Patented May 17, 1910.

Witnesses

Inventor
Joseph G. Strock
By C. A. Snow & Co.
Attorneys

UNITED STATES PATENT OFFICE.

JOSEPH G. STROCK, OF TRINDLE SPRING, PENNSYLVANIA.

TOOTHPICK.

958,335.  Specification of Letters Patent.  Patented May 17, 1910.

Application filed May 14, 1909. Serial No. 495,916.

*To all whom it may concern:*

Be it known that I, JOSEPH G. STROCK, a citizen of the United States, residing at Trindle Spring, in the county of Cumberland and State of Pennsylvania, have invented a new and useful Toothpick, of which the following is a specification.

This invention relates to toothpicks and its object is to provide an inexpensive device of simple construction which can be conveniently carried in the pocket and which can be used a number of times.

Another object is to provide a device of this character so shaped as to produce a wiping action between the teeth and which is arranged to engage the foreign matter lodged between the teeth and thus insure the removal thereof.

Another object is to provide a series of these toothpicks mounted within a housing from which they can be readily shifted when it is desired to use them.

With these and other objects in view the invention consists of certain novel details of construction and combinations of parts hereinafter more fully described and pointed out in the claim.

In the accompanying drawings the preferred forms of the invention have been shown.

Figure 1:
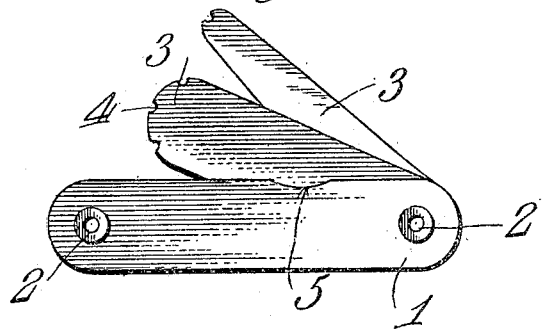
Figure 2:
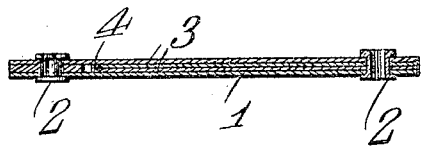
Figure 3:
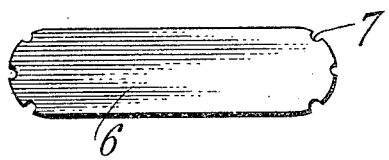
Figure 4:

In said drawings, Figure 1 is a perspective view of a toothpick made up of more than one blade and a housing therefor. Fig. 2 is a longitudinal section through said device, the blades being shown housed. Fig. 3 is a detail view of a modified form of toothpick. Fig. 4 is a detail view of another form of toothpick.

Referring to the drawings by characters of reference 1 designates side strips connected adjacent their ends by means of rivets 2 and one of these rivets constitutes the pivot of one or more blades 3 each of which is preferably formed of thin celluloid or other flexible material, the ends of the blades being rounded and the free end of each blade being formed with one or more notches 4. These blades are designed to be housed between the strips 1 when the device is not in use and said blades can be readily swung out of the housing by placing the tips of the fingers into notches 5 formed in the strips 1 and in which the blades are exposed. Said blades can thus be grasped between the fingers and swung outwardly. Should it be desired to remove foreign matter from between the teeth the notched end of one of the blades is inserted between the teeth and drawn back and forth. The notches will thus receive the foreign matter and dislodge it. By providing a blade such as described and having a notched rounded end the foreign matter can be removed from between the teeth by a simple wiping action and the gums will not be injured as is often the case where a pointed toothpick is used. By having a series of radially disposed notches upon the rounded end of the blade, as shown in Figs. 3 and 4, the said blade can be held at different angles and be effectively used. This is advantageous because it is necessary to hold a tooth pick at various angles, according to the location of the teeth, and of the foreign matter held by them.

Although the blades are preferably mounted within the housing as shown in Fig. 1 the same can be employed without the housing as shown in Figs. 3 and 4. In the form shown in Fig. 3 the blade 6 has both ends rounded and notched as indicated at 7 so that either end can be utilized. The life of the toothpick is thus greatly increased.

Inasmuch as some teeth are less accessible than others and it would therefore be difficult to insert a broad blade therebetween the toothpick can if desired be constructed as shown in Fig. 4 wherein two notched ends are employed one of the ends however being narrower than the other. A single notch 8 can be formed within the narrow end while the other end can be provided with a plurality of notches as indicated at 9. As heretofore stated the blade is formed of very thin material so that it can be readily inserted between the teeth.

The device herein described will be found particularly useful as an advertising novelty, inasmuch as suitable advertising matter can be printed or otherwise indicated either upon the blades or on the housing.

What is claimed is:—

A tooth pick comprising a thin flexible blade having a semi-circular end provided in both sides and in its end with a plurality of semi-circular notches, the outer end of each wall of each notch forming an engaging shoulder, both shoulders of each notch being equidistant from a radial line bisecting said notch.

In testimony that I claim the foregoing as my own, I have hereto affixed my signature in the presence of two witnesses.

JOSEPH G. STROCK.

Witnesses:
 J. WESLEY MOSES,
 J. M. BYERS.